United States Patent [19]

Sakakiyama

[11] Patent Number: 4,679,674
[45] Date of Patent: Jul. 14, 1987

[54] SYSTEM FOR ENGAGING AN ELECTROMAGNETIC CLUTCH UPON ACCELERATION OF AN ENGINE

[75] Inventor: Ryuzo Sakakiyama, Tokyo, Japan

[73] Assignees: Fuji Jukogyo Kabushiki Kaisha, Tokyo, Japan; Van Doorne's Transmissie B.V., Tilburg, Netherlands

[21] Appl. No.: 682,976

[22] Filed: Dec. 18, 1984

[30] Foreign Application Priority Data

Dec. 22, 1983 [JP] Japan ................... 58-243452

[51] Int. Cl.⁴ ............................................... B60K 41/02
[52] U.S. Cl. ................................ 192/0.052; 192/0.07; 192/3.56
[58] Field of Search ............... 192/0.052, 0.07, 0.075, 192/0.076, 0.092, 0.096, 3.54, 3.55, 3.56, 3.58, 3.61, 3.62, 21.5, 103 R

[56] References Cited

U.S. PATENT DOCUMENTS

| | | | |
|---|---|---|---|
| 3,372,602 | 3/1968 | Papst | 192/3.56 X |
| 4,295,551 | 10/1981 | Zimmermann | 192/3.58 X |
| 4,473,143 | 9/1984 | Windsor | 192/0.052 |
| 4,494,639 | 1/1985 | Takano et al. | 192/0.052 |
| 4,509,625 | 4/1985 | Tellert | 192/103 R |

FOREIGN PATENT DOCUMENTS

| | | | |
|---|---|---|---|
| 15024 | 1/1982 | Japan . | |
| 57-15023 | 1/1982 | Japan | 192/3.63 |

Primary Examiner—Leslie A. Braun
Assistant Examiner—Dwight G. Diehl
Attorney, Agent, or Firm—Martin A. Farber

[57] ABSTRACT

A system for controlling clutch torque for a vehicle having a transmission and an electromagnetic clutch provided between an engine and the transmission. The system comprises an engine speed sensor, a computing unit for determining the speed of a driven member of the electromagnetic clutch, an accelerator pedal switch for detecting the acceleration of the vehicle and for producing an acceleration signal, and a comparator for comparing the engine speed with the speed of said driven member and for producing an output when both speeds substantially coincide with each other. The system has an AND gate responsive to the acceleration signal and the output for producing a clutch engaging signal, thereby engaging the electromagnetic clutch.

11 Claims, 3 Drawing Figures

SYSTEM FOR ENGAGING AN ELECTROMAGNETIC CLUTCH UPON ACCELERATION OF AN ENGINE

BACKGROUND OF THE INVENTION

The present invention relates to a system for controlling the clutch torque of an electromagnetic clutch disposed between the crankshaft of an engine and the transmission of a motor vehicle.

A clutch torque control system for starting and deceleration of a vehicle is, for example, disclosed in Japanese Patent Laid Open No. 57-15024. In this system, the clutch current flowing in a coil of the clutch exponentially increases with respect to the increase of the engine speed for starting the vehicle. When vehicle speed exceeds a predetermined speed (for example 20 km/h), lock-up current flows through the coil, so that the clutch is completely engaged. Upon the deceleration of the vehicle, when the vehicle speed decreases below the predetermined speed, the clutch current is cut off to disengage the clutch.

In such a control system, if the accelerator pedal of the vehicle is depressed for acceleration of the vehicle in the disengage condition of the clutch at a low vehicle speed, the clutch current is passed through the coil in dependency on the engine speed in a similar way as when starting the vehicle. In such an acceleration condition, the driven shaft of the clutch is rotated, by rotating wheels of the vehicle, through the transmission. The rotation speed of the driven shaft is determined by the vehicle speed and transmission ratio at that time. When the speed of the drive member of the clutch is much lower than the speed of the driven member when engaging the clutch, the vehicle is braked by the engine operation, resulting in a decrease in the vehicle speed.

SUMMARY OF THE INVENTION

The object of the present invention is to provide a system for controlling the clutch torque of an electromagnetic clutch which can prevent engine-braking upon re-engagement of the clutch in low speed condition of the vehicle, thereby increasing the driveability of the vehicle.

To this end, in accordance with the present invention, the system comprises means for measuring the engine speed, means for measuring the speed of a driven member of an electromagnetic clutch, means for detecting the acceleration of a vehicle and for producing an acceleration signal, means for comparing the engine speed with the speed of the driven member and for producing an output when both speeds substantially coincide with each other, and means responsive to the acceleration signal and the output for producing a clutch engaging signal, thereby engaging the electromagnetic clutch.

The other objects and features of this invention will become understood from the following description with reference to the accompanying drawings.

DETAILED DESCRIPTION OF THE PREFERRED EMBODIMENT

Figure 1:
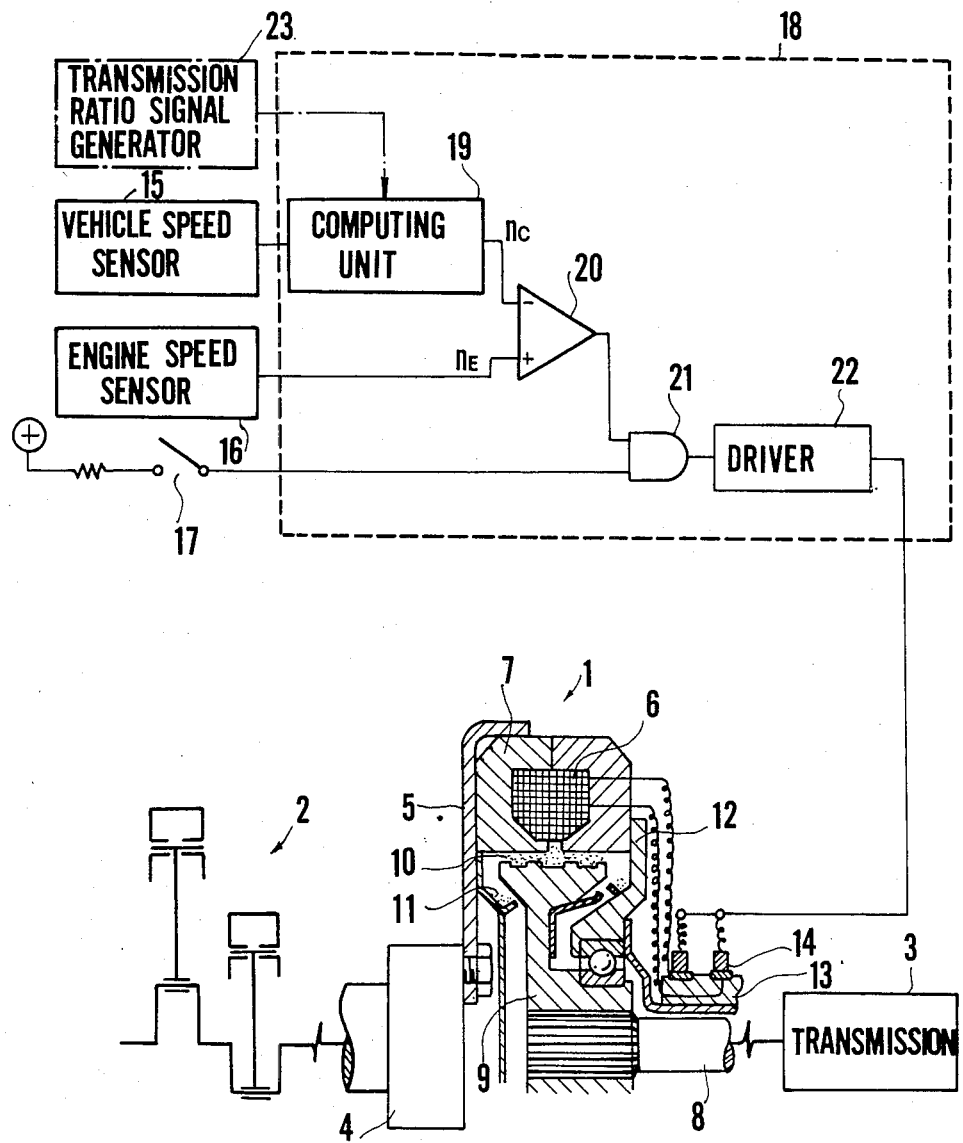
FIG. 1 is a schematic diagram showing an embodiment of the present invention.

Referring to FIG. 1, an electromagnetic powder clutch 1 is provided for transmitting the power of an engine 2 to wheels (not shown) of a vehicle through a belt-drive infinitely variable transmission 3. The electromagnetic powder clutch 1 comprises a drive member 7 connected to a crankshaft 4 of the engine 2 through a drive plate 5, a coil 6 provided in the drive member 7, a driven member 9 having its outer periphery spaced from the inner periphery of the drive member 7 by a gap 10, and a powder chamber 11 defined between the drive member 7 and driven member 9. The powder chamber 11 is filled with magnetic powder material. The driven member 9 is secured to an input shaft 8 of the belt-drive transmission 3. A holder 12 secured to the drive member 7 carries slip rings 13 which are electrically connected to the coil 6. The coil 6 is supplied through brushes 14 and the slip rings 13 with control current from a control unit 18.

When the magnetizing coil 6 is excited by clutch current, the drive member 7 is magnetized to produce a magnetic flux passing through the driven member 9. The magnetic powder is aggregated in the gap 10 by the magnetic flux and the driven member 9 is engaged with the drive member 7 by the powder. On the other hand, when the clutch current is cut off, the drive and driven members 7 and 9 are disengaged from one another.

The transmission ratio of the transmission 3 is determined in dependency on engine speed and vehicle speed. When the vehicle speed is lower than a predetermined low speed, the transmission ratio is at the highest ratio. The speed of the driven member 9 can be calculated by multiplying the vehicle speed by the transmission ratio. To determine the speed of the driven member, a vehicle speed sensor 15 and a computing unit 19 are provided. Also an engine speed sensor 16, and an accelerator pedal switch 17 are provided. The engine speed sensor 16 comprises, for example, a shaping circuit for shaping the ignition pulses of the engine or a sensor for detecting the crank angle of the crankshaft 4. The output of the vehicle speed sensor 15 is applied to the computing unit 19 which multiplies the transmission ratio with the vehicle speed to provide an output representing the speed of the driven member 9, and the outputs of the computing unit 19 and the engine speed sensor 16 are applied to a comparator 20. Outputs of the comparator 20 and switch 17 are connected to an AND gate 21. The output of the AND gate 21 is applied to the coil 6 through a driver 22.

Figure 2:
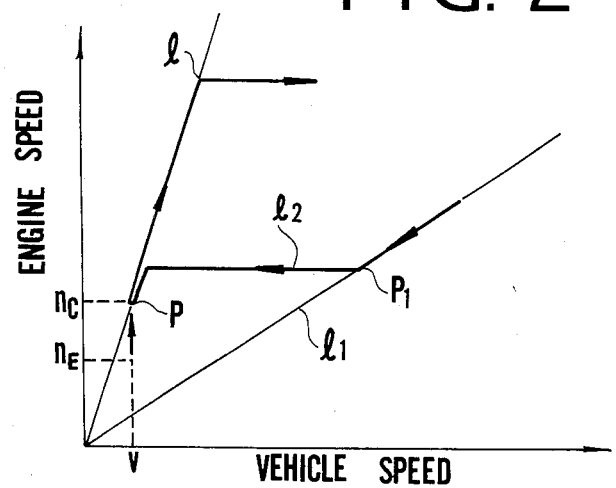
FIG. 2 is a graph showing a transmission characteristic of an transmission employed in a system of the present invention.

FIG. 2 shows the relationship between the engine speed and vehicle speed of a vehicle, in which the variation of the transmission ratio is represented. A line l is the highest transmission ratio line and a line $l_1$ is the lowest transmission ratio line. When the vehicle is decelerated, the engine and vehicle speeds decrease along the line $l_2$ at the lowest transmission ratio. When the engine speed reaches a lower limit point $P_1$ for the lowest transmission ratio, the transmission ratio begins to increase. Accordingly, the vehicle speed decreases along the horizontal line $l_1$. When the vehicle speed reaches the highest transmission line l, the clutch 1 is disengaged. After that, when the accelerator pedal is depressed at point P in order to re-accelerate the vehicle, where the vehicle speed is V, the accelerator pedal switch 17 is turned on to apply a high level signal to AND gate 21. The computing unit 19 computes the speed (nc) of the driven member 9 by multiplying the vehicle speed (V) by the highest transmission ratio. When the engine speed (ne) is lower than the driven member speed (nc), the comparator 20 produces a low output. When the engine speed becomes higher than the driven member speed by the depression of the accelerator pedal, the output of the comparator 20 goes to a high level. Accordingly, the AND gate 21 produces an output, so that clutch current flows in the coil 6. Thus, the clutch is engaged without the occurrence of engine braking, and engine speed and vehicle speed increase along the line 1 as shown in FIG. 2.

Figure 3:
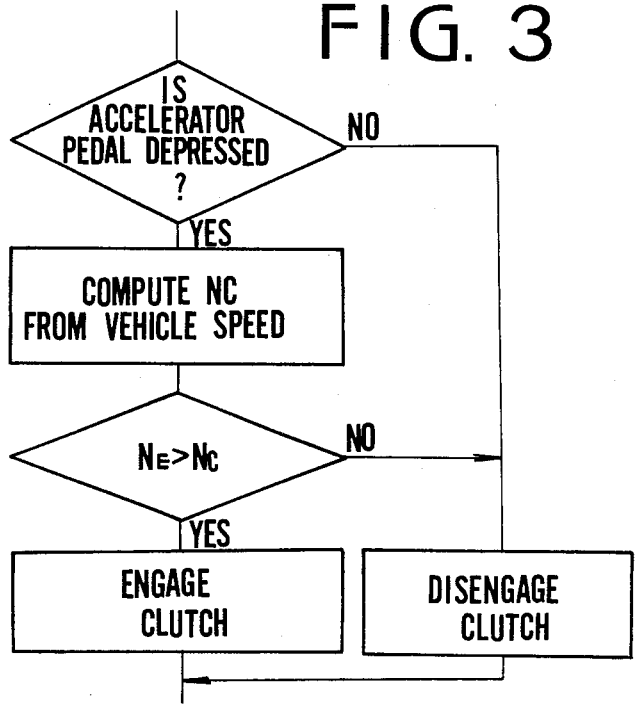
FIG. 3 is a flow chart showing a process in a microprocessor employed in another embodiment of the present invention.

FIG. 3 shows a flow chart for controlling the clutch torque by a microcomputer.

Although the above described system is provided with an infinitely variable transmission, in a system for a manual transmission, a transmission ratio signal generator 23 is provided as shown in FIG. 1. The generator 23 is adapted to produce a transmission ratio signal dependent on the gear ratio. The signal is applied to the computing unit 19 to produce the driven member speed.

From the foregoing, it will be understood that the present invention provides a clutch torque control system which engages the clutch when the speed of the drive member of the clutch coincides with the driven member speed, thereby preventing the engine braking phenomenon.

What is claimed is:

1. In a system for controlling clutch torque for a vehicle having an engine, a transmission, and an electromagnetic clutch between the engine and the transmission, the clutch having a drive member and a driven member driven by said drive member when the clutch is engaged, the clutch being automatically completely disengaged when vehicle speed decreases below a predetermined value, the improvement comprising:
   means for controlling the clutch when accelerating the vehicle, after deceleration, from a low speed driving condition where the vehicle speed is below the predetermined value where the clutch is completely disengaged, so that the clutch remains completely disengaged until said controlling means completely engages the clutch when engine speed substantially equals speed of the driven member of the clutch, comprising:
   first means for determining engine speed;
   second means for determining the speed of the driven member of said electromagnetic clutch of a completely disengaged condition of the clutch;
   third means for detecting acceleration of said vehicle and producing an acceleration signal when said acceleration is detected;
   fourth means for comparing said engine speed with said speed of said driven member and producing an output when both the speeds substantially coincide with each other; and
   fifth means responsive to occurrence simultaneously of said acceleration signal and said output for completely engaging said electromagnetic clutch which heretofore was completely disengaged.

2. The system according to claim 1 wherein said second means comprises a vehicle speed sensor, a transmission ratio signal generator, and a computing unit for computing the speed of the driven member of the electromagnetic clutch from the outputs of the vehicle speed sensor and transmission ratio signal generator.

3. The system according to claim 2 wherein said fourth means is a comparator, and said fifth means is an AND gate.

4. The system according to claim 1, wherein
   the transmission is an infinitely variable transmission, and
   said second means comprises a vehicle speed sensor and a computing means for computing said speed of the driven member from an output of said vehicle speed sensor and the transmission ratio of the transmission.

5. The system according to claim 4, wherein
   said vehicle speed sensor determines the vehicle speed, and
   said computing means computes said speed of the driven member by multiplying the vehicle speed by the highest transmission ratio of the transmission.

6. The system according to claim 1, wherein
   said fifth means completely engages said clutch when said engine speed is at least equal to said speed of said driven member.

7. In a system for controlling clutch torque for a vehicle having an engine, a transmission, and an electromagnetic clutch between the engine and the transmission, the clutch having a drive member and a driven member driven by said drive member when the clutch is engaged, the clutch being automatically completely disengaged when vehicle speed decreases below a predetermined value, the improvement comprising:
   first means for determining engine speed;
   second means for determining the speed of the driven member of said electromagnetic clutch at a completely disengaged condition of the clutch;
   third means for detecting acceleration of said vehicle and producing an acceleration signal when said acceleration is detected;
   fourth means for comparing said engine speed with said speed of said driven member and producing an output when both the speeds substantially coincide with each other; and
   fifth means responsive to occurrence simultaneously of said acceleration signal and said output for completely engaging said electromagnetic clutch which heretofore was completely disengaged.

8. In a system for controlling clutch torque for a vehicle having an engine, a transmission, and an electromagnetic clutch connected between the engine and the transmission, the clutch having a drive member and a driven member driven by said drive member when the clutch is engaged, the clutch being automatically completely disengaged when vehicle speed decreases below a predetermined value, the improvement comprising:
   microcomputer means for controlling the clutch when accelerating the vehicle from a low speed driving condition where the vehicle speed is below the predetermined value where the clutch is completely disengaged, the clutch remaining completely disengaged until complete engagement of the clutch when engine speed substantially equals speed of the driven member of the clutch, comprising
   first means for determining acceleration of the vehicle at said low speed driving condition,
   second means for determining speed of the driven member, third means for completely engaging the clutch when said first means determines acceleration and engine speed is at least equal to the speed of the driven member.

9. The system according to claim 8, wherein
said first means determines the acceleration by detecting depression of an accelerator pedal of the vehicle.

10. The system according to claim 8, wherein
said second means includes means for determining vehicle speed, and
said second means determines the speed of the driven member from vehicle speed.

11. In a system for controlling a clutch having a driven member connected to a transmission of a vehicle having an engine connected to the clutch, the system automatically completely disengaging the clutch when vehicle speed during deceleration falls to a low speed range lower than a predetermined low speed, the improvement comprising
means for keeping said clutch completely disengaged during acceleration of the engine from said low speed range until said engine speed at least substantially equals speed of said driven member of said clutch, and completely engaging said clutch when said engine speed at least substantially equals the speed of said driven member of said clutch.

* * * * *